(12) United States Patent
Jung

(10) Patent No.: US 7,029,372 B2
(45) Date of Patent: Apr. 18, 2006

(54) METHOD OF FORMING AN ELECTRODE EQUIPPED IN AN APPARATUS FOR MANUFACTURING AN ARRAY SUBSTRATE OF A LIQUID CRYSTAL DISPLAY DEVICE

(75) Inventor: Chang-Sung Jung, Gumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/180,908

(22) Filed: Jun. 27, 2002

(65) Prior Publication Data

US 2003/0009868 A1    Jan. 16, 2003

(30) Foreign Application Priority Data

Jun. 29, 2001    (KR) .............................. 2001-38228

(51) Int. Cl.
   *B24B 1/00*   (2006.01)
   *H01L 21/00*   (2006.01)

(52) U.S. Cl. .................... 451/28; 451/54; 257/E21.011

(58) Field of Classification Search ................. 451/41, 451/28, 54, 55, 59, 36; 51/307–309; 257/E21.011–E21.013
See application file for complete search history.

(56) References Cited

U.S. PATENT DOCUMENTS

| 5,482,614 | A | * | 1/1996 | Kondo et al. ................ 205/171 |
| 5,598,285 | A |   | 1/1997 | Kondo et al. |
| 5,708,486 | A | * | 1/1998 | Miyawaki et al. ............ 349/44 |
| 5,838,037 | A |   | 11/1998 | Masutani et al. |
| 5,946,060 | A |   | 8/1999 | Nishiki et al. |
| 5,990,987 | A |   | 11/1999 | Tanaka |
| 6,028,653 | A |   | 2/2000 | Nishida |
| 6,097,454 | A |   | 8/2000 | Zhang et al. |
| 6,166,792 | A | * | 12/2000 | Miyawaki et al. .......... 349/113 |
| 6,428,392 | B1 | * | 8/2002 | Sunahara et al. ............. 451/36 |

FOREIGN PATENT DOCUMENTS

| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kieler et al.; "In-Plane Switching of Nematic Liquid Crystals"; Japan Display '92; pp. 547-550.
M. Oh-e, et al.; "Principles and Characteristics of Electro-Optical Behaviour with In-Plane Switching Mode"; Asia Display '95; pp. 577-580.

(Continued)

*Primary Examiner*—Hadi Shakeri
(74) *Attorney, Agent, or Firm*—McKenna Long & Aldrigde LLP

(57) ABSTRACT

The present invention relates to a method of forming an electrode of an apparatus for manufacturing a liquid crystal display (LCD) device, wherein the electrode has a substantially flat surface. A method of forming an electrode of an apparatus for manufacturing a liquid crystal display device includes milling an aluminum plate, wherein the milling comprises roughing, rest roughing and finishing, polishing an upper surface of the aluminum plate by using fine ceramic powder, and anodizing the aluminum plate.

18 Claims, 7 Drawing Sheets

OTHER PUBLICATIONS

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; 37 High-Transmittance, Wide-Viewing-Angle Nematic Liquid Crystal Display Controlled by Fringe-Field Switching; Asia Display '98; pp. 371-374.

* cited by examiner

METHOD OF FORMING AN ELECTRODE EQUIPPED IN AN APPARATUS FOR MANUFACTURING AN ARRAY SUBSTRATE OF A LIQUID CRYSTAL DISPLAY DEVICE

This application claims the benefit of Korean Patent Application No. 2001-38228, filed on Jun. 29, 2001 in Korea, which is hereby incorporated by reference in its entirety for all purposes as if fully set forth herein.

BACKGROUND OF THE INVENTION

1. Field of the Invention

The present invention relates to an apparatus for manufacturing a liquid crystal display (LCD) device and more particularly, to a method of forming an electrode for an array substrate of the LCD device in a dry etching apparatus.

2. Discussion of the Related Art

Generally, a liquid crystal display (LCD) device has an upper substrate and a lower substrate, which are spaced apart and facing each other, and liquid crystal disposed between the upper and lower substrates. Each of the substrates includes an electrode and the electrodes of each substrate are also facing each other. The LCD device uses an optical anisotropy of liquid crystal and produces an image by controlling light transmissivity by varying the arrangement of liquid crystal molecules, which are arranged by an electric field.

A conventional liquid crystal display (LCD) device will be described hereinafter more in detail with reference to FIG. 1. FIG. 1 is an exploded perspective view illustrating a conventional LCD device. The conventional LCD device 11 has upper and lower substrates 5 and 22, which are spaced apart and facing each other, and also has a liquid crystal 14 to be interposed between the upper substrate 5 and the lower substrate 22. The liquid crystal 14 has positive or negative dielectric anisotropy.

A gate line 13 is formed horizontally (in the context of the figure) on the inside of the lower substrate 22 and a data line 15 is also formed vertically (in the context of the figure) on the inside of the lower substrate 22. The gate line 13 and the data line 15 cross each other to define a pixel area "P". A thin film transistor "T" is situated at the crossing of the gate line 13 and the data line 15. A pixel electrode 17, which is connected to the thin film transistor "T", is formed in the pixel area "P". The pixel electrode 17 is made of a transparent conductive material like Indium-Tin-Oxide (ITO) or Indium Zinc Oxide (IZO).

Next, a black matrix 6, which has an opening corresponding to the pixel electrode 17, is formed on the inside of the upper substrate 5. A color filter 7 corresponding to the opening of the black matrix 6 is formed on the black matrix 6. The color filter 7 includes three colors: red (R), green (G) and blue (B). Each color corresponds to a respective pixel electrode 17. Subsequently, a transparent common electrode 18 is formed on the color filter 7.

In the conventional LCD device of FIG. 1, when a voltage is applied to the pixel electrode 17 and the common electrode 18, an electric field is induced between the pixel electrode 17 and the common electrode 18 in a direction perpendicular to the upper and lower substrates 5 and 22. Molecules of the liquid crystal 14 are arranged by the electric field and light is emitted through the arranged liquid crystal 14 from a back light (not shown) disposed below the conventional LCD device, so that pictures are displayed.

However, as this conventional LCD device has a narrow viewing angle, LCD devices having a wide viewing angle have been researched and developed. An in-plane switching (IPS) mode LCD device is one of the wide viewing angle LCD devices. In the in-plane switching (IPS) mode LCD device, a pixel electrode and a common electrode are formed on the same substrate, and thus an electric field is induced in a direction parallel with the substrates of the in-plane switching (IPS) mode LCD device.

FIG. 2 is a plan view illustrating an array substrate of the in-plane switching (IPS) mode LCD device according to the prior art. As shown in FIG. 2, in the array substrate of the conventional in-plane switching mode LCD device, a gate line 32 of a horizontal direction and a data line 44 of vertical direction cross each other and define a pixel region "P". The gate line 32 and the data line 44 are made of a metal material, especially having relatively low resistivity. A thin film transistor "T", i.e. a switching device, is formed at the crossing of the gate line 32 and the data line 44. The thin film transistor "T" includes a gate electrode 34, a source electrode 46, a drain electrode 48 and an active layer 40. The gate electrode 34, which may be a part of the gate line 32, is connected to the gate line 32 and the source electrode 46 is connected to the data line 44. The source and drain electrodes 46 and 48 are apart from each other at regular intervals and overlap the gate electrode 34.

A common line 36 and three common electrodes 37 are formed in the pixel region "P". The common line 36 is formed horizontally (in the context of the figure), i.e. in parallel with the gate line 32, and the common electrodes 37 extend vertically (in the context of the figure) from the common line 36. Each common electrode 37 includes a first vertical part 37a, which is located between the one gate line 32 and the common line 36, and a second vertical part 37b, which is disposed between the common line 36 and the other gate line 32. Also, a pixel electrode 50 is formed in the pixel region "P". The pixel electrode 50 includes two vertical parts 50a parallel with the common electrodes 37 and a horizontal part 50b connecting two vertical parts 50a. The horizontal part 50b of the pixel electrode 50 overlaps the gate line 32, so that the horizontal part 50b and the overlapped gate line 32 form a storage capacitor "Cst". One of the vertical parts 50a of the pixel electrode 50 is connected to the drain electrode 48. The common electrodes 37 and the vertical parts 50a of the pixel electrode 50 have an alternating arrangement. Some of the common electrodes 37 also lie near the data line 44, and the common electrodes are spaced apart from each other. Here, the common electrodes 37 may be formed of the same material as the gate line 32, and the pixel electrode 50 may be made of the same material as the data line 44.

In the above-mentioned array substrate, each element is formed using a photolithographic process. The photolithographic process includes steps of depositing a thin film, coating a photo-resist material, exposing the photo-resist to a light, developing the photo-resist, and etching the thin film. A method of etching the thin film is classified into two types: wet etching and dry etching. The wet etching utilizes chemical solvents, and the dry etching utilizes plasma to eliminate a part of the thin film. More recently, the dry etching method is widely used due to short processing time and good selectivity.

FIG. 3 illustrates a conventional apparatus for dry etching. As shown in the figures, the dry etching apparatus 60 includes a chamber 62, which has a gas injecting hole 68a and a pumping port 68b. The gas injecting hole 68a is disposed at the top surface of the chamber 62, and the pumping port 68b is located at the bottom surface of the chamber 62. The gas injecting hole 68a is a path for reactive gas for the etching, and the pumping port 68b is an outlet for air in the chamber 60.

Within the chamber 62, an upper electrode 64 and a lower electrode 66 are disposed facing apart from each other. The upper electrode 64 is grounded, and high frequency power is applied to the lower electrode 66. The lower electrode 66 has a pinhole 73. A pin 72, which moves a substrate 70 thereon up and down, is disposed in the pinhole 73. The substrate 70, which includes a thin film to be etched, is located on the pin 72.

Dry etching using the above-mentioned apparatus, especially reactive ion etching method, will be described. First, the substrate 70 including a thin film (not shown) thereon is situated over the lower electrode 66, more particularly on the pin 72, and the air in the chamber 62 is exhausted out of the chamber 62 through the pumping port 68b. Then, etching gas to remove a part of the thin film (not shown) is injected into the chamber 62 through the gas injecting hole 68a. Thereafter, when a high frequency power is applied to the lower electrode 66, molecules of the etching gas are excited due to the energy of the power, and reactive species, for example atoms, radicals, and ions, are generated in plasma between the upper electrode 64 and the substrate 70. The reactive species react with the material of the thin film (not shown), and the thin film (not shown) on the substrate 70 is etched. By the way, when the array substrate of the IPS mode LCD device is manufactured by using the apparatus of FIG. 3, spots can be observed in the IPS mode LCD. Causes of these spots being created will be described.

FIG. 4 is a plan view illustrating an IPS mode LCD device formed by a conventional dry etching method. As illustrated in FIG. 4, a substrate 679 mm long and 590 mm wide is used for manufacturing a liquid crystal display panel 80 of the IPS mode LCD device. Two IPS mode LCD devices can be formed of the above-sized substrate. An array substrate (not shown) of the liquid crystal display panel 80 is manufactured by using the dry etching apparatus of the FIG. 3. Here, several series of spots 82 are observed in the liquid crystal display panel 80 of the IPS mode LCD device, but are not found in a normal mode LCD device such as a twisted nematic mode LCD device. The series of spots 82 appears in a horizontal direction and each series of spots 82 is spaced apart from each other by a distance about 50 mm vertically.

FIG. 5 is a plan view illustrating a part of a lower electrode of a conventional dry etching apparatus shown in FIG. 3. In FIG. 5, a lower electrode 66 of a conventional dry etching apparatus is covered with an oxidized film 86. The oxidized film 86 prevents the lower electrode 66 from reacting with reactive species. A plurality of vertical lines 84 are projecting parts of the upper surface of the lower electrode 66 of the conventional dry etching apparatus. Each vertical line 84 is spaced apart from each other at about 50 mm intervals, which correspond to the distance between the series of spots 82 of FIG. 4. Here, the array substrate (not shown) of the liquid crystal display panel 80 of FIG. 4 rotates in a 90-degree arc and is disposed on the lower electrode 66 of FIG. 5. Then, dry etching is accomplished.

Generally, the lower electrode 66 of the conventional dry etching apparatus is manufactured in milling, polishing, and anodizing processes. The milling is a process cutting a metal plate and includes roughing, rest roughing and finishing steps. The polishing is a process that makes the surface of the lower electrode 66 smooth by rubbing, and the anodizing is to oxidize the surface of the lower electrode 66.

FIG. 6 illustrates a milling process of a lower electrode of a conventional dry etching apparatus and more particularly, shows a roughing process or a rest roughing process. FIGS. 7A and 7B illustrates a finishing process of the lower electrode of the conventional dry etching apparatus.

In FIG. 6, a miller (not shown), which is 50 mm in diameter, moves vertically in the context of the figure to define a first arc 90a. At this time, friction is produced between the miller and the upper surface of the lower electrode 66, and thus the upper surface of the lower electrode 66 contacting the miller is cut. Subsequently, the miller is shifted and also moves vertically in the context of the figure to define a second arc 90b in the neighboring region of the first arc 90a. Repeating this process in the next region, the upper surface of the lower electrode 66 is entirely cut. By the way, protrusions about 1 mm in width are formed between the arcs, for example a protrusion "A" between the first arc 90a and the second arc 90b. The protrusions "A" are spaced apart from each other at about 50 mm intervals.

Next, as shown in FIGS. 7A and 7B, a finishing process causes the surface of the lower electrode uniform. However, a hollow "B" may be formed on the surface of the lower electrode 66 due to particles 96 on the surface of a polishing roller 94, wherein the particle 96 is created in the above process of FIG. 6.

Therefore, it is difficult to compensate for these protrusions "A" of FIG. 6 and hollow "B" of FIG. 7B by polishing, the next process of the above processes, and to set roughness and flatness of the surface of the lower electrode.

FIGS. 8A and 8B illustrate a conventional lower electrode 66 and a substrate 70 thereon. FIG. 8A is a perspective view the conventional lower electrode, and FIG. 8B is a cross-sectional view along a line VIIIB—VIIIB of FIG. 8A. In the figures, a substrate 70 to be etched is situated on a lower electrode 66 of a conventional dry etching apparatus, wherein the lower electrode 66 is formed by the above processes of FIGS. 6, 7A and 7B. As stated above, the lower electrode 66 has a plurality of protrusions 84 spaced apart by about 50 mm. Therefore, as shown in FIG. 8B, the substrate 70 contacts points "C" corresponding to the protrusions 84, while the substrate 70 does not contact points "D", each of which is the middle point between the points "C" and is sunken.

During an etching process, the temperature of the substrate 70 contacting the points "C" falls by about 50 degrees Celsius. On the other hand, the temperature of the substrate 70 corresponding to the points "D" rises. Therefore, the substrate 70 contacting the points "C" is over-etched more than the substrate 70 corresponding to the points "D". The etched surface of the substrate 70 is not uniform and critical dimension is shortened. This difference of the critical dimensions causes irregular layers on the etched substrate 70. Thus, spots show in an IPS mode LCD device, which has several patterns in a pixel region.

SUMMARY OF THE INVENTION

Accordingly, the present invention is directed to a method of forming an electrode of an apparatus manufacturing a liquid crystal display (LCD) device that substantially obviates one or more of problems due to limitations and disadvantages of the related art.

An advantage of the present invention is to provide a method of forming an electrode of an apparatus for manufacturing a liquid crystal display (LCD) device, wherein the electrode has a substantially flat surface.

Another advantage of the present invention is to provide a method of forming an electrode of an apparatus for fabricating an IPS mode LCD device in which spots are not found.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of forming an electrode of an apparatus for manufacturing a liquid crystal display device includes milling an aluminum plate, polishing an upper surface of the aluminum plate by using fine ceramic powder, and anodizing the aluminum plate.

In another aspect of the present invention, an electrode of an apparatus for manufacturing a liquid crystal display device is prepared by milling an aluminum plate, polishing an upper surface of the aluminum plate using fine ceramic powder; and anodizing the aluminum plate.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
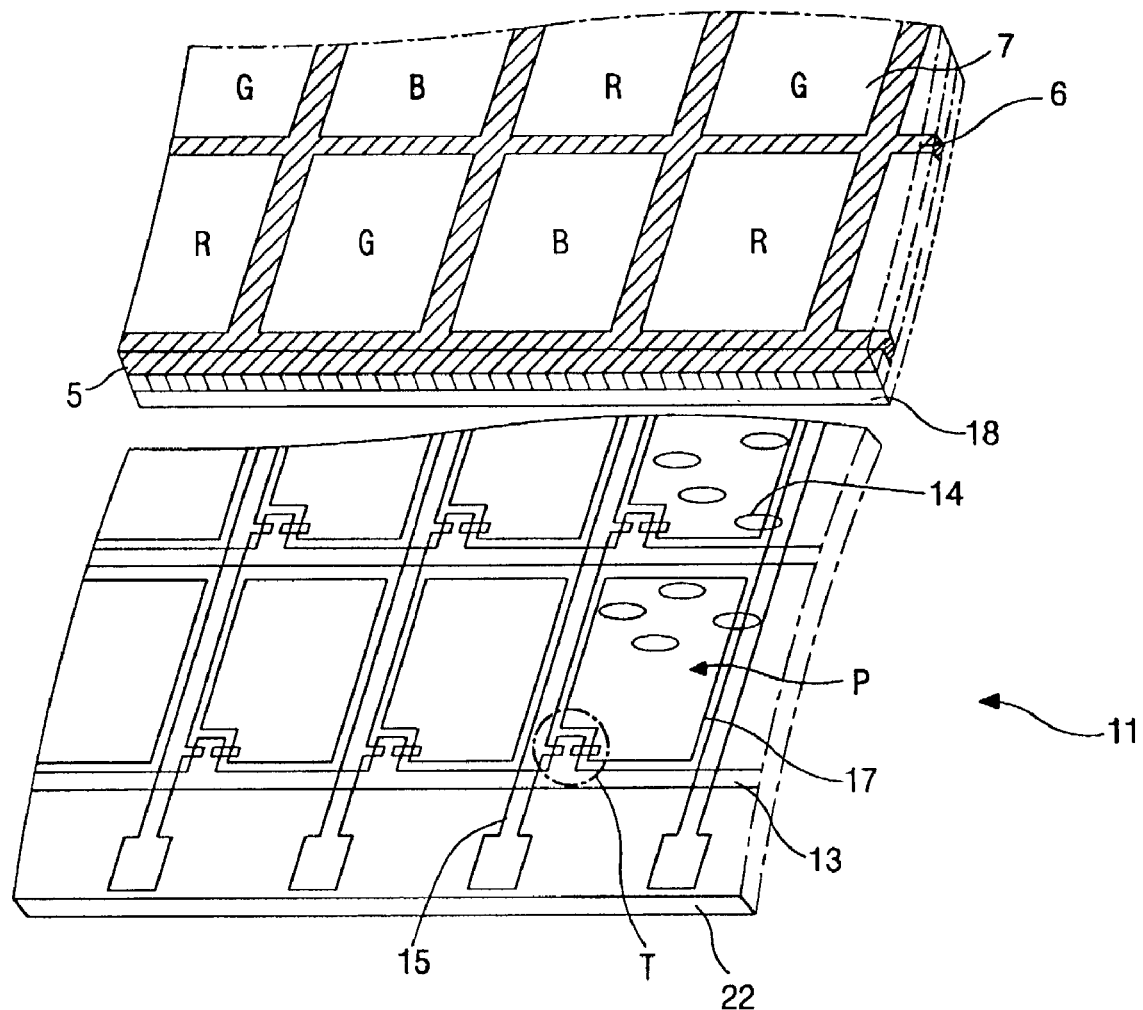
FIG. 1 is an exploded perspective view illustrating a conventional liquid crystal display (LCD) device.
Figure 2:
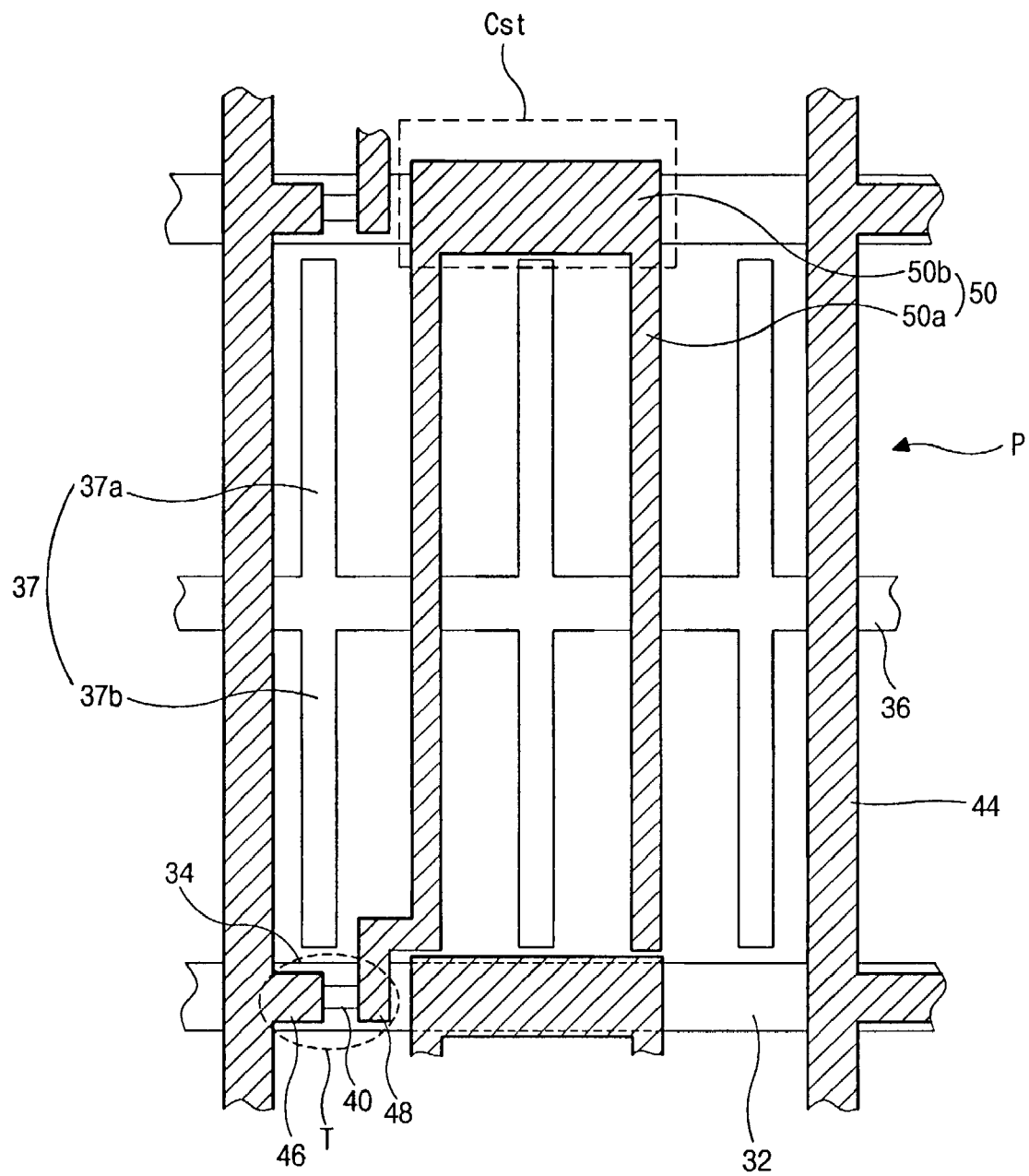
FIG. 2 is a plan view illustrating an array substrate of the in-plane switching (IPS) mode LCD device according to the prior art.
Figure 3:
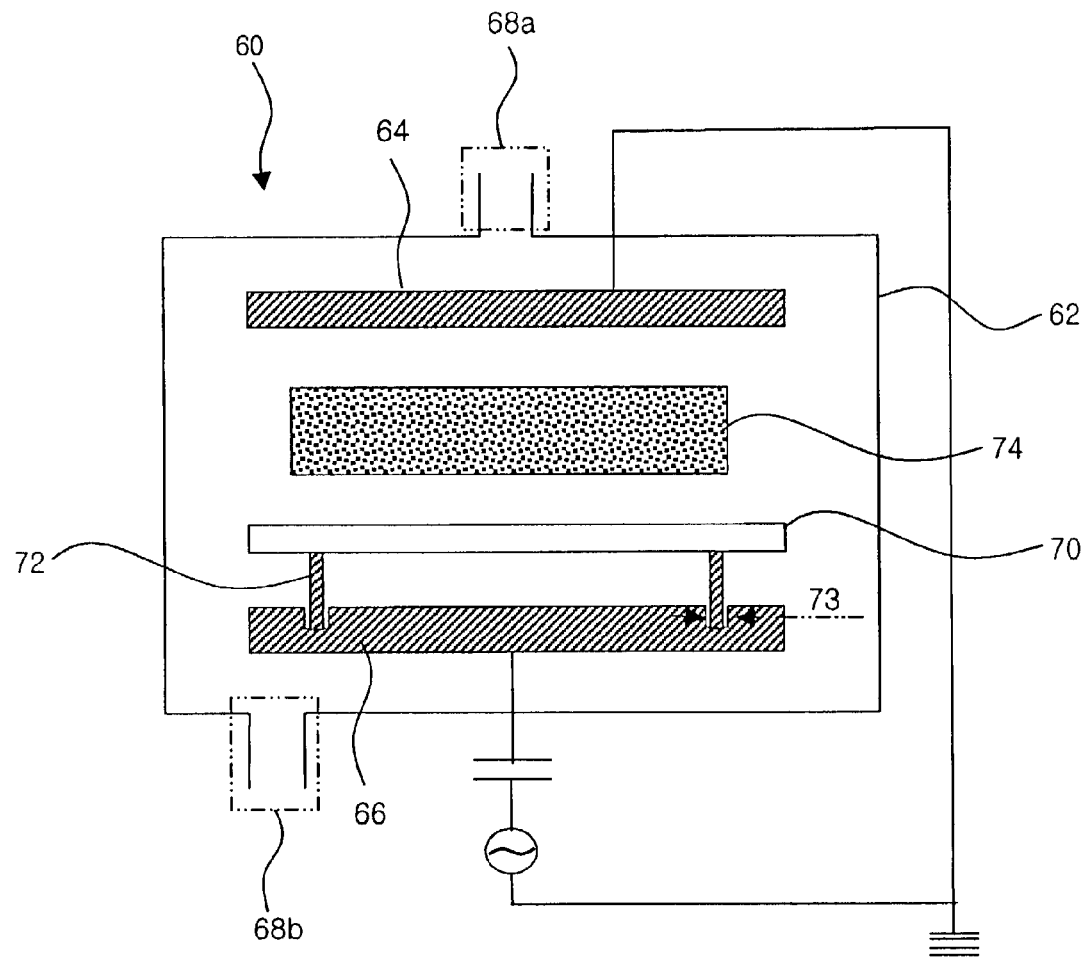
FIG. 3 illustrates a conventional apparatus for dry etching.
Figure 4:
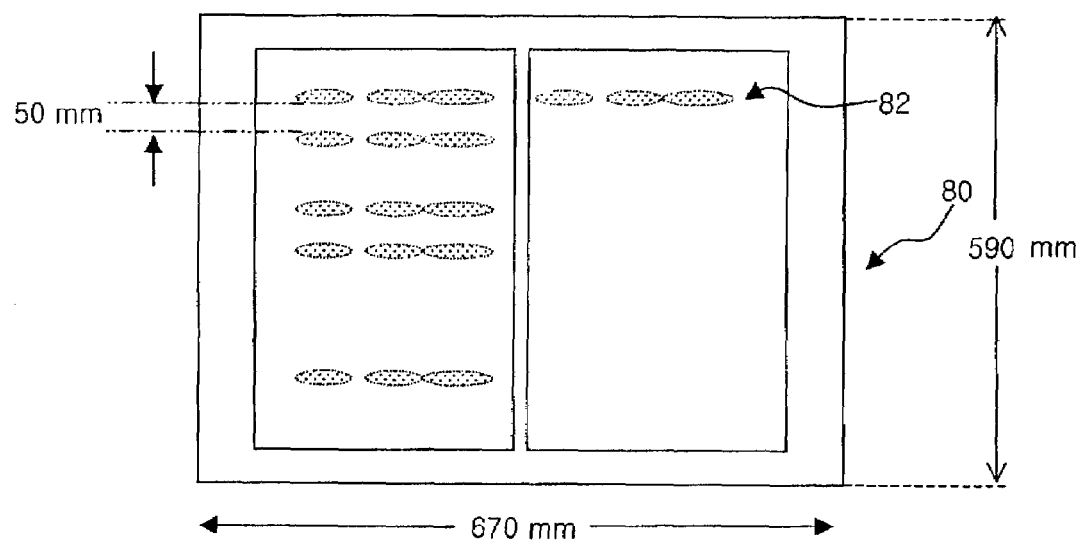
FIG. 4 is a plan view illustrating an IPS mode LCD device formed by a conventional dry etching method.
Figure 5:
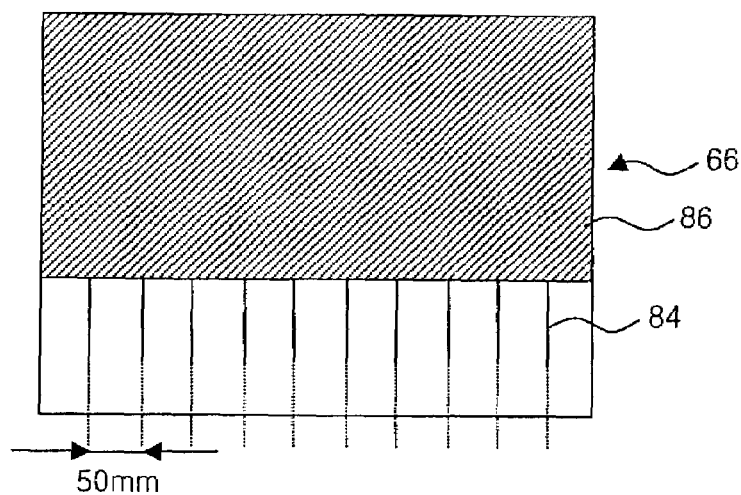
FIG. 5 is a plan view illustrating a part of a lower electrode of a conventional dry etching apparatus.
Figure 6:
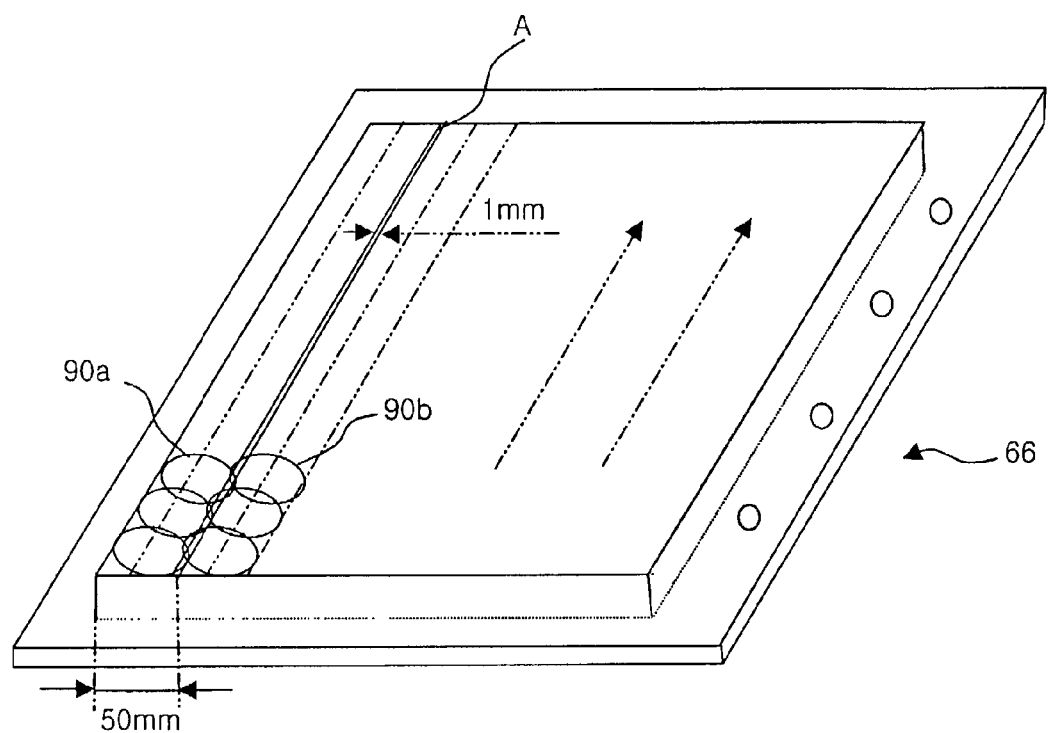
FIG. 6 illustrates a milling process of a lower electrode of a conventional dry etching apparatus.
Figure 7A:
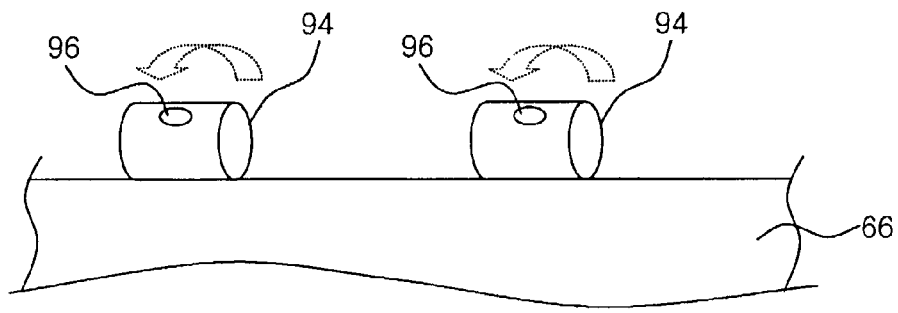
FIGS. 7A and 7B illustrate a finishing process of the lower electrode of the conventional dry etching apparatus.
Figure 7B:
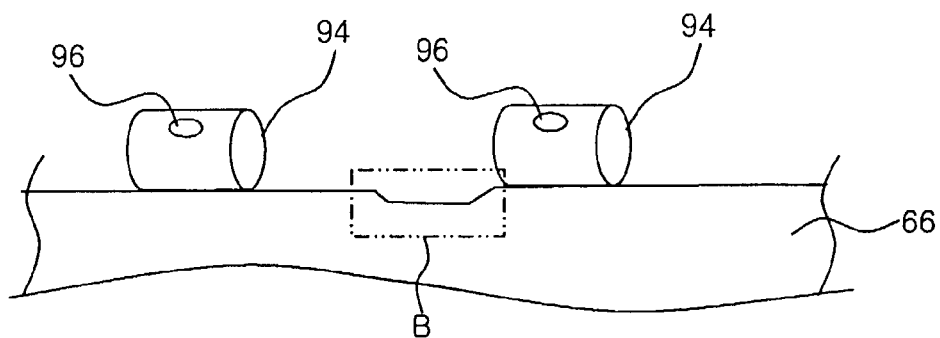
Figure 8A:
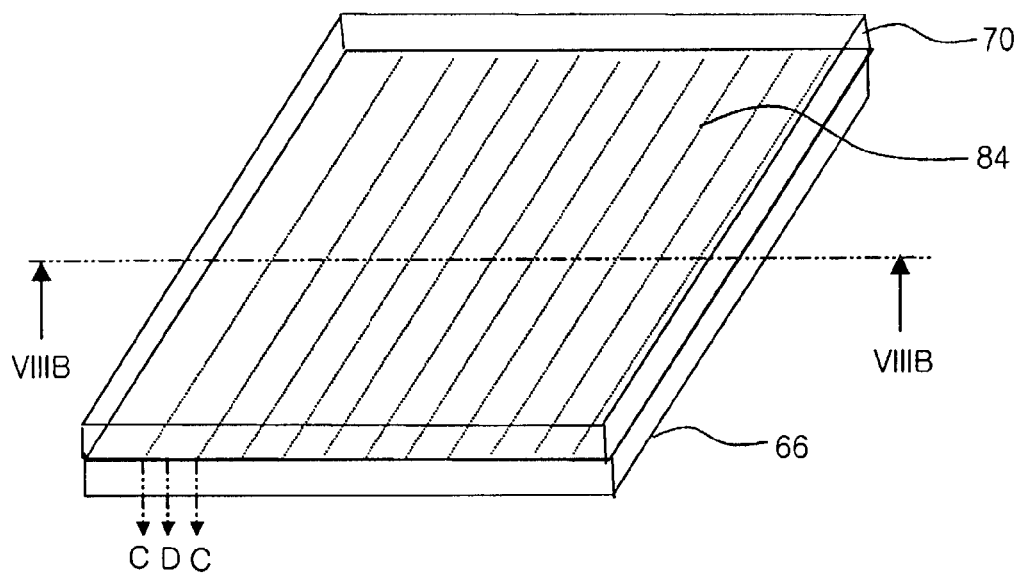
FIGS. 8A and 8B illustrate a conventional lower electrode including a substrate thereon.
Figure 8B:
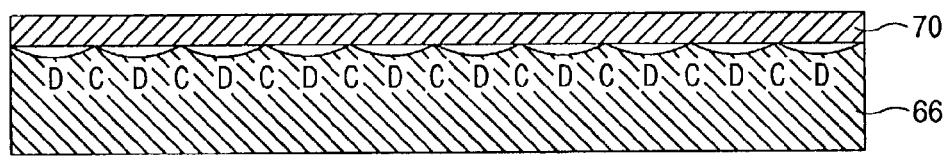
Figure 9A:
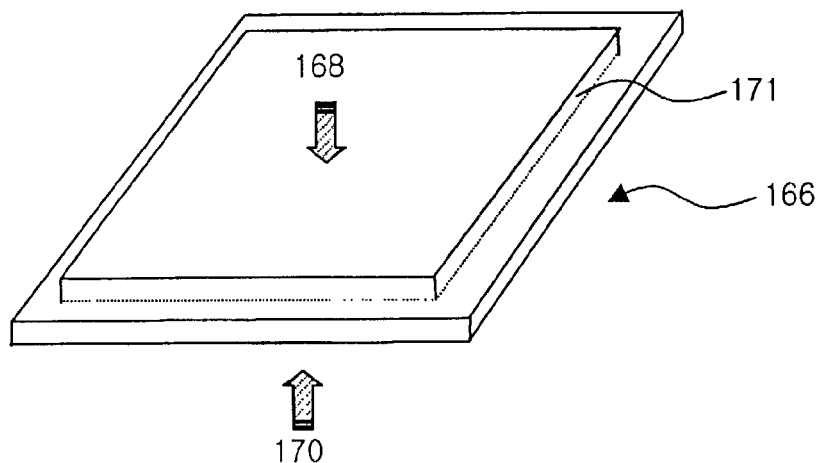
FIGS. 9A to 9C illustrate processes of forming a lower electrode of a dry etching apparatus according to the present invention.
Figure 9B:
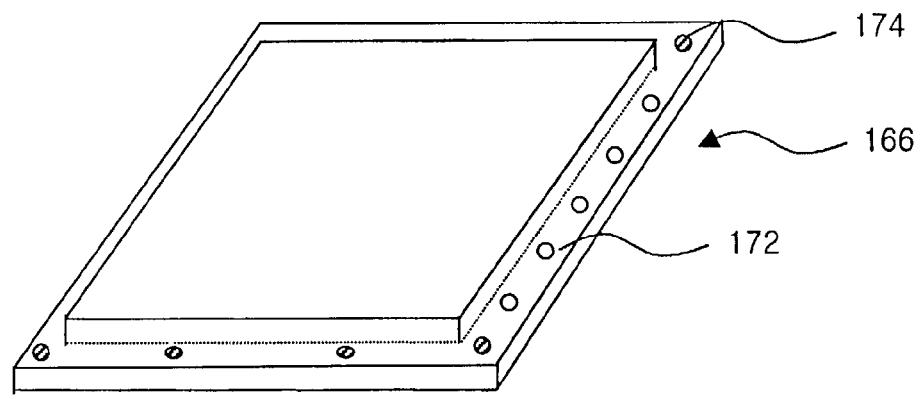
Figure 9C:
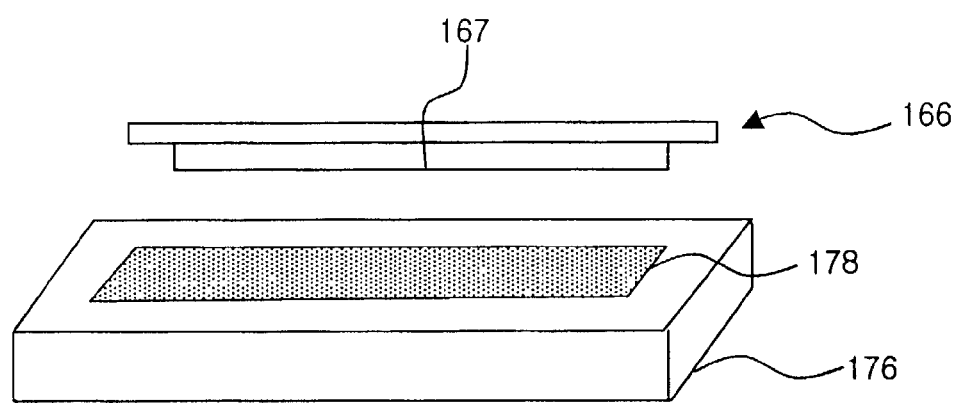

FIGS. 9A to 9C illustrate processes of forming a lower electrode of a dry etching apparatus according to the present invention. The dry etching apparatus of the present invention may be the same structure as the apparatus of FIG. 3.

FIG. 9A shows a milling process of a lower electrode of a dry etching apparatus according to the present invention. First, a roughing is carried out. The roughing is to cut a plate of material such as aluminum rough when a manufacturing margin is large. The upper surface 168 and the lower surface 170 of the aluminum plate 166 are cut rough. The cut aluminum plate 166 has a thickness of about 0.8 to 1.0 mm. At this time, a face cutter (not shown), which cuts a plane of a metal plate, is used. The aluminum plate 166 of about 0.5 mm at a time is cut off by the face cutter (not shown). Both sides of the aluminum plate 166 are cut four times during the roughing process.

Next, a rest roughing is carried out. A face cutter (not shown) such as that of the roughing process may be used. The face cutter of the rest roughing has a larger angle than that of the roughing. The angles of the face cutter for the rest roughing is between the margin surface of the aluminum plate and the blade of the face cutter. In the rest roughing, the amount to be cut is smaller than the amount cut during the earlier roughing. Here, a step 171 is also formed at the side wall of the aluminum plate 166 by using an end mill (not shown).

A finishing is subsequently accomplished by using a tool such as polishing roller stated above. At this time, holes 172 and 174 of FIG. 9B may be formed. The first hole 172 is a lift pin hole for a lift pin (not shown), which moves a substrate (not shown) thereon up and down. The second hole 174 is a screw hole to fix the aluminum plate 166 in an etching apparatus (not shown). Here, protrusions (not shown) and hollows (not shown) remain on the upper surface of the aluminum plate 166.

Then, as illustrated in FIG. 9C, polishing is performed. The polishing is a mirror polishing and uses fine ceramic powder 178. The ceramic powder 178 may be made of alumina ($Al_2O_3$). As shown in the figure, the ceramic powder 178 is scattered on a surface plate 176 and the upper surface 167 of the aluminum plate 166 is polished by being placed in contact with and rubbed with the ceramic powder 178. By this mirror polishing, protrusions (not shown) formed in the above milling process are removed. Therefore, the aluminum plate 166, a lower electrode of a dry etching apparatus, has a flat surface.

Next, the aluminum plate 166 is oxidized to prevent the surface of the aluminum plate 166 from reacting with etching gases and from corroding. The oxidized surface of the aluminum plate 166 may be made of aluminum oxide ($Al_2O_3$).

The lower electrode formed by this present invention has flatness of about 0.01 to 0.03 mm, with respect to a level surface, and roughness of about 0.9 to 1.1 μm, which is the measure of unevenness of the surface. Therefore, the lower electrode of the present invention substantially contacts all parts of a substrate to be posited thereon and the substrate is etched uniformly.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A method of forming an electrode of an apparatus for manufacturing a liquid crystal display device, comprising:
   milling an aluminum plate;
   scattering a fine ceramic powder on a surface plate;

polishing an upper surface of the aluminum plate using the fine ceramic powder wherein the polishing removes protrusions in the aluminum plate formed during the milling operation; and anodizing the aluminum plate.

2. The method according to claim 1, wherein the fine ceramic powder includes alumina ($Al_2O_3$).

3. The method according to claim 1, wherein the aluminum plate has flatness of about 0.01 to 0.03 mm.

4. The method according to claim 1, wherein the aluminum plate has roughness of about 0.9 to 1.1 µm.

5. The method according to claim 1, wherein the polishing is a mirror polishing.

6. The method according to claim 1, wherein the milling comprises roughing, rest roughing and finishing.

7. The method according to claim 6, wherein the finishing includes forming a lift pin hole and a screw hole.

8. The method according to claim 1, wherein the polishing includes contacting the upper surface of the aluminum plate with the fine ceramic powder on the surface plate, and rubbing the upper surface of the aluminum plate with the fine ceramic powder on the surface plate.

9. The method according to claim 1, wherein the aluminum plate has an oxidized film.

10. The method of claim 1, wherein the upper surface of the aluminum plate contacts substantially all parts of a surface of a substrate which is being posited thereon.

11. A method of forming an electrode comprising:

milling an aluminum plate;

scattering a fine ceramic powder on a surface plate;

removing protrusions in the aluminum plate formed during the milling operation, wherein polishing the aluminum plate with the ceramic powder removes the protrusions; and anodizing the aluminum plate.

12. The method according to claim 11, wherein the ceramic powder includes Alumina ($Al_2O_3$).

13. The method according to claim 11, wherein the operation of removing protrusions includes mirror polishing.

14. The method according to claim 11, the method further comprising:

oxidizing the aluminum plate.

15. The method according to claim 11, wherein the electrode has a flatness between 0.01 mm and 0.03 mm.

16. The method according to claim 11, wherein the electrode has roughness between 0.9 µm and 1.1 µm.

17. The method according to claim 11, the operation of removing protrusions further comprising:

contacting an upper surface of the aluminum plate with the ceramic powder; and rubbing the upper surface of the aluminum plate with the ceramic powder.

18. The method of claim 11, wherein the upper surface of the aluminum plate contacts substantially all parts of a surface of a substrate which is being posited thereon.

* * * * *